United States Patent
Karapantelakis et al.

(10) Patent No.: US 10,742,495 B2
(45) Date of Patent: Aug. 11, 2020

(54) COMMUNICATION DEVICE, GATEWAY NODE AND METHODS FOR PREPARING A POINT-TO-POINT SESSION

(71) Applicant: Telefonaktiebolaget LM Ericsson (publ), Stockholm (SE)

(72) Inventors: Athanasios Karapantelakis, Stockholm (SE); Maxim Teslenko, Sollentuna (SE); Konstantinos Vandikas, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 266 days.

(21) Appl. No.: 15/534,014

(22) PCT Filed: Jan. 12, 2015

(86) PCT No.: PCT/SE2015/050009
§ 371 (c)(1),
(2) Date: Jun. 8, 2017

(87) PCT Pub. No.: WO2016/114688
PCT Pub. Date: Jul. 21, 2016

(65) Prior Publication Data
US 2017/0353354 A1    Dec. 7, 2017

(51) Int. Cl.
*H04L 12/24*    (2006.01)
*H04W 76/14*    (2018.01)
(Continued)

(52) U.S. Cl.
CPC ........ *H04L 41/0813* (2013.01); *H04L 67/104* (2013.01); *H04L 69/18* (2013.01);
(Continued)

(58) Field of Classification Search
None
See application file for complete search history.

(56) References Cited

U.S. PATENT DOCUMENTS 5,751,972 A * 5/1998 Quinn ............... H04L 29/06
709/223
6,108,350 A * 8/2000 Araujo ............ H04M 11/062
370/359

(Continued)

FOREIGN PATENT DOCUMENTS

WO    2005125145 A1    12/2005
WO    2014047868 A1    4/2014

OTHER PUBLICATIONS

"Software Defined Radio (SDR) on Graphic Processing Unit (GPU)". Posted at http://www.cs.cmu.edu/~xil/sdrgpu.html on Jun. 9, 2008. (Year: 2008).*

(Continued)

*Primary Examiner* — Scott B Christensen
(74) *Attorney, Agent, or Firm* — Murphy, Bilak & Homiller, PLLC

(57) ABSTRACT

A method performed by a first communication device, for preparing a point-to-point, Pt2Pt, session with a second communication device is provided. The first communication device receives (202) from the second communication device, information about one or more communication protocol stacks that are supported by the second communication device for use in the Pt2Pt session. The first communication device obtains (208) a first communication protocol stack that is compatible with at least one out of the one or more protocol stacks that are supported by the second communication device. The first communication protocol stack will be used in the Pt2Pt session with the second communication device. The first communication device then re-configures (209) the first communication device to use the first communication protocol stack in the Pt2Pt session, and sends (210) a message to the second communication device. The message comprises information about said compatible first (Continued)

communication protocol stack which is to be used in the Pt2Pt session.

8 Claims, 7 Drawing Sheets

(51) Int. Cl.
 *H04L 29/08* (2006.01)
 *H04L 29/06* (2006.01)
 *H04W 28/18* (2009.01)
(52) U.S. Cl.
 CPC .............. *H04L 69/24* (2013.01); *H04L 69/30* (2013.01); *H04W 76/14* (2018.02); *H04W 28/18* (2013.01)

(56) References Cited

U.S. PATENT DOCUMENTS

| | | | |
|---|---|---|---|
| 6,990,107 B1* | 1/2006 | Rinne | H04L 29/06 370/395.6 |
| 9,215,075 B1* | 12/2015 | Poltorak | H04L 9/32 |
| 2004/0047437 A1 | 3/2004 | Hamiti et al. | |
| 2006/0217072 A1* | 9/2006 | Poyhonen | H04W 88/06 455/67.11 |
| 2007/0160059 A1 | 7/2007 | Poeluev et al. | |
| 2007/0254596 A1* | 11/2007 | Corson | H04L 5/0035 455/68 |
| 2008/0133727 A1* | 6/2008 | Belqasmi | H04L 41/022 709/223 |
| 2008/0137548 A1 | 6/2008 | Hassan et al. | |
| 2008/0253391 A1* | 10/2008 | Krits | H04L 12/1818 370/466 |
| 2009/0119760 A1* | 5/2009 | Hung | H04L 63/0823 726/6 |
| 2010/0309817 A1* | 12/2010 | Johnsson | H04L 67/125 370/254 |
| 2012/0117250 A1 | 5/2012 | Santamaria et al. | |
| 2012/0218942 A1* | 8/2012 | Lu | H04W 28/06 370/328 |
| 2014/0344467 A1* | 11/2014 | Eckert | H04L 69/03 709/230 |

OTHER PUBLICATIONS

Burger et al. "Session Initiation Protocol (SIP) INFO Method and Package Framework." Retrieved from https://tools.ietf.org/id/draft-ietf-sip-info-events-00.html. Published Oct. 21, 2008. (Year: 2008).*

* cited by examiner

COMMUNICATION DEVICE, GATEWAY NODE AND METHODS FOR PREPARING A POINT-TO-POINT SESSION

TECHNICAL FIELD

Embodiments herein relate to a first communications device, a gateway node and methods therein. In particular, it relates to preparing a point-to-point (Pt2Pt) session with a second communication device involving device communication protocol re-configuration.

BACKGROUND

Wireless devices for communication such as communication devices or terminals are also known as e.g. User Equipments (UE), mobile terminals, wireless terminals and/or mobile stations. Wireless devices are enabled to communicate wirelessly in a cellular communications network or wireless communication system, sometimes also referred to as a cellular radio system or cellular networks. The communication may be performed e.g. between two wireless devices, between a wireless device and a regular telephone and/or between a wireless device and a server, such as server providing video streaming service, via a Radio Access Network (RAN) and possibly one or more core networks, comprised within the cellular communications network.

Wireless devices may further be referred to as mobile telephones, cellular telephones, computers, or surf plates with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another wireless device or a server.

When one network node initiates a communication session, such as e.g. an audio, a video, or a data session with another node, they both need to have compatible voice or video or other codecs. However there are cases when two nodes that want to communicate may not have compatible protocol stacks a priori. This may be accentuated when taking into account on the Internet of Things (IoT) vision of billion devices.

The IoT is the interconnection of uniquely identifiable embedded computing devices within the existing Internet infrastructure. Typically, IoT is expected to offer advanced connectivity of devices, systems, and services that goes beyond Machine-to-Machine (M2M) communications and covers a variety of protocols, domains, and applications.

Things, in the IoT, may refer to a wide variety of devices such as heart monitoring sensors, implants, biochip transponders on farm animals, automobiles with built-in sensors, or field operation devices that assist fire-fighters in search and rescue. Current market examples include smart thermostat systems and washer/dryers that utilize wifi for remote monitoring.

In order to establishing a communication session, devices such as sensors typically use low power protocol stacks such as e.g. IEEE 802.15.4-based ZigBee or 6LowPAN connectivity, while wireless devices such as e.g. wireless devices phones have protocol stacks such as IEEE 802.11.x based protocol stacks (WiFi) or $3^{rd}$ Generation Partnership Project (3GPP) protocol stacks such as Global System for Mobile Communications (GSM), High Speed Downlink Packet Access (HSDPA) and Long-Term Evolution (LTE).

IEEE 802.15.4 specifies the physical and Media Access Control (MAC) network layers for Low-Rate Wireless Personal Area Networks (LR-WPANs), and aims to provide low-complexity, low-cost and low-power wireless connectivity between devices.

The ZigBee standard defines a network layer on top of the IEEE 802.15.4 stack and adds mesh-networking capabilities (passing of data between devices to cover large geographical areas).

IEEE's IPv6 over Low-Power Wireless Personal Area Networks (6LoWPANs) is another standard that offers a network layer with IPv6 connectivity, and thus interoperability with other Transmission Control Protocol/Internet Protocol (TCP/IP) devices such as Internet nodes. 6Low-PAN also builds on IEEE 802.15.4 stack.

IEEE 802.11 defines a physical and a MAC layer for Wireless Local Area Networks. Contrary to 802.15.4, IEEE 802.11 is an established wireless standard that offers greater range without the low-power features of 802.15.4. It is more applicable for devices that have large network capacity requirements and ample power (e.g. smartphones or laptops).

A problem with existing solutions is that in many cases, devices with incompatible protocol stacks require special hardware as mediator in order to establish a session. For example, if interoperability is required between 6LowPAN and ZigBee standards, as bridging of the two will require gateways with complex application layer protocols.

SUMMARY

It is therefore an object of embodiments herein to provide an improved way of establishing a session between peers in a in a communications network.

According to a first aspect of embodiments herein, the object is achieved by a method performed by a first communication device, for preparing a point-to-point, Pt2Pt, session with a second communication device. The first communication device receives from the second communication device, information about one or more communication protocol stacks that are supported by the second communication device for use in the Pt2Pt session. The first communication device obtains a first communication protocol stack that is compatible with at least one out of the one or more protocol stacks that are supported by the second communication device. The first communication protocol stack will be used in the Pt2Pt session with the second communication device. The first communication device then re-configures the first communication device to use the first communication protocol stack in the Pt2Pt session, and sends a message to the second communication device. The message comprises information about said compatible first communication protocol stack which is to be used in the Pt2Pt session.

According to a second aspect of embodiments herein, the object is achieved by a method performed by a gateway node, for assisting in preparing a point-to-point, Pt2Pt, session between a first communication device and a second communication device. The gateway node forwards to the first communication device, information about the one or more communication protocol stacks that are supported by the second communication device in the Pt2Pt session. The information has been received from the second communication device. The gateway node receives in a message from the first communication device, an indication that no one out of the one or more protocol stacks that are supported by the second communication device in the Pt2Pt session, is supported by the first communication device. The gateway node obtains a first communication protocol stack from a vendor of communication protocol stacks. The first communication protocol stack is compatible with at least one out of the one or more protocol stacks that are supported by the first communication device. The first communication protocol stack is to be used by the first communication device and the second communication device in the Pt2Pt session. The gateway node sends a message to the first communication device. The message comprises information about said obtained first communication protocol stack which is to be used in the Pt2Pt session. The gateway node re-configures the first communication device to use said first communication protocol stack in the Pt2Pt session. The gateway node sends a message to the second communication device. The message comprises information about said first communication protocol stack which is to be used in the Pt2Pt session.

According to a third aspect of embodiments herein, the object is achieved by a method performed by a first communication device, for preparing a point-to-point, Pt2Pt, session with a second communication device.

The first communication device is configured to receive from the second communication device, information about one or more communication protocol stacks that are supported by the second communication device for use in the Pt2Pt session.

The first communication device is further configured to obtain a first communication protocol stack that is compatible with at least one out of the one or more protocol stacks that are supported by the second communication device. The first communication protocol stack is arranged to be used in the Pt2Pt session with the second communication device.

The first communication device is further configured to re-configure the first communication device to use the first communication protocol stack in the Pt2Pt session.

The first communication device is further configured to send a message to the second communication device. The message comprises information about said compatible first communication protocol stack which is arranged to be used in the Pt2Pt session.

According to a forth aspect of embodiments herein, the object is achieved by a gateway node, for assisting in preparing a point-to-point, Pt2Pt, session between a first communication device and a second communication device.

The gateway node 131 is configured to forward to the first communication device, information about the one or more communication protocol stacks that are arranged to be supported by the second communication device in the Pt2Pt session. The information is arranged to have been received from the second communication device.

The gateway node 131 is further configured to receive in a message from the first communication device, an indication that no one out of the one or more protocol stacks that are supported by the second communication device in the Pt2Pt session, is supported by the first communication device.

The gateway node 131 is further configured to obtain a first communication protocol stack from a vendor of communication protocol stacks. The first communication protocol stack is compatible with at least one out of the one or more protocol stacks that are arranged to be supported by the first communication device. The first communication protocol stack is arranged to be used by the first communication device and the second communication device in the Pt2Pt session.

The gateway node 131 is further configured to send a message to the first communication device, which message comprises information about said obtained first communication protocol stack which is arranged to be used in the Pt2Pt session, The gateway node 131 is further configured to re-configure the first communication device to use said first communication protocol stack in the Pt2Pt session.

The gateway node 131 is further configured to send a message to the second communication device. The message comprises information about said first communication protocol stack which is arranged to be used in the Pt2Pt session.

Since the first communication device receives from the second communication device, information about one or more communication protocol stacks that are supported by the second communication device for use in the Pt2Pt session and the first communication device obtains a first communication protocol stack that is compatible with at least one out of the one or more protocol stacks that are supported by the second communication device, the protocol for the Pt2Pt session is negotiated and re-configured dynamically to support different protocol stacks. This results in an improved way of establishing a session between peers in a in a communications network.

An advantage with embodiments herein is that there are less requirements for intermediate nodes, as radios on devices can be reconfigured dynamically to support different protocol stacks. The role of a gateway is not to translate between different protocols anymore, but is only used in some embodiments to negotiate the protocol re-configuration sequence on the first and second communication devices. After that, devices with Software Defined Radio (SDR) radios can communicate directly. This means that there is less Capital Expenditure (CAPEX) and Operating Expenditure (OPEX) from the network operator's side, as less gateways will be required and maintained.

Wherein CAPEX means money used to acquire or maintain physical assets such as buildings, equipment, etc., and wherein OPEX means ongoing costs used to fund business operations such as e.g. servicing costs.

A further advantage with embodiments herein is that it provides lower latency and potentially higher bandwidth as an effect of the above.

BRIEF DESCRIPTION OF THE DRAWINGS

Examples of embodiments herein are described in more detail with reference to attached drawings in which.

DETAILED DESCRIPTION

As part of developing embodiments herein, a problem will first be identified and shortly discussed.

A problem with existing solutions is that in many cases, devices with incompatible protocol stacks require special hardware as mediator in order to establish a session. For example, there may be cases where a phone needs to communicate with a sensor directly. Sensors typically use low power protocol stacks such as e.g. IEEE 802.15.4-based ZigBee or 6LowPAN, while phones have protocol stacks such as IEEE 802.11.x connectivity, this is referred to as WiFi. Although 6LowPAN can address IPv6/802.11x networks, other cases where Zigbee and 6LowPAN and/or ZibBee and 802.11.x enabled devices need to establish sessions requiring existence of an intermediate gateway, which needs to do protocol translation using some application-level protocol. This process can add latency to the session and can produce additional costs relating to the purchasing and maintenance of gateway equipment.

In traditional approach, a gateway receives data from sensors and relays this data to other devices. This implies that the gateway may have preconfigured hardware and software resources to support the protocols of the devices involved a priori. In this case, a Xbee radio chip, together with a WiFi module are required. The gateway receives data from the Xbee radio and relays it to the WiFi radio.

According to embodiments herein, the role of the gateway is not to relay data. Instead, the gateway is only present to act as a mediator for communication protocol setup, i.e. to enable direct communication between any type of devices. In order to achieve this, the gateway does not have dedicated radio hardware for each protocol such as e.g. Xbee or WiFi, but instead reconfigurable hardware e.g. using SDR. The gateway may cycle between different protocol stacks in order to detect nearby devices. A gateway may have more than one SDRs to accelerate discovery of nearby devices. Embodiments herein supports multiple configurations of the gateway and devices wanting to communicate.

Embodiments herein provide methods and a communications system for negotiating session management protocol configuration between devices using different protocol stacks.

Figure 1:
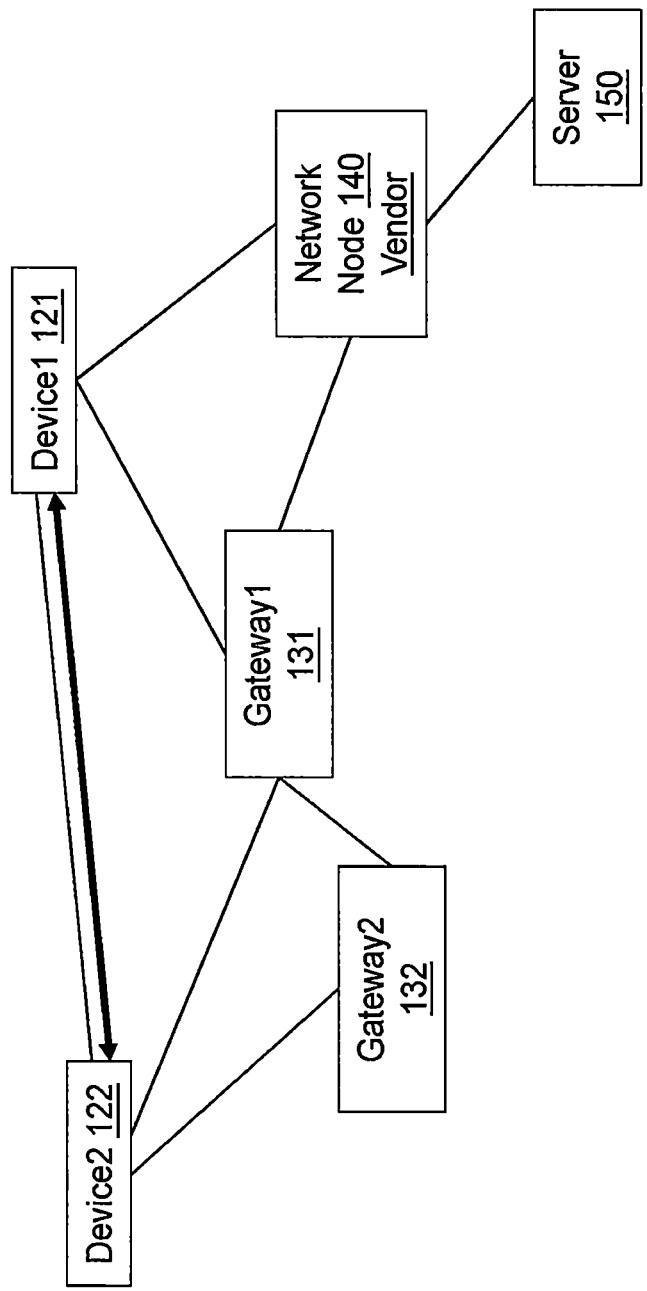
FIG. 1 is a schematic block diagram illustrating a communications network.

FIG. 1 depicts a communications network 100 also referred to as a communications system, in which embodiments herein may be implemented. The communications network 100 is e.g. an IEEE 802.3, i.e. Ethernet-based wired network or 802.11 WiFi network. The communications network 100 may further relate to a radio network such as an GSM, HSDPA, LTE, a Wideband Code Division Multiple Access (WCDMA), Fifth Generation (5G), a Wimax, or any communication network or system.

Two or more communication devices operate in the communications network 100, whereof a first communication device 121 and a second communication device 122 are depicted in FIG. 1. The first communication device 121 is denoted device1 and the second communication device 122 is denoted device2 in the Figures herein. The first communication device 121 and the second communication device 122 may be referred to as network nodes and may be wired or wireless devices. If wireless, the first communication device 121 and the second communication device 122 may e.g. be mobile wireless terminals, mobile phones, computers such as e.g. laptops, or tablet computers, sometimes referred to as a surf plates, with wireless capabilities, or any other radio network units capable to communicate over a radio link in a communications network. If wired, the first communication device 121 and the second communication device 122 may e.g. be IEEE 802.3 compatible voice over IP (VoIP) terminals, Power over Ethernet (POE) sensors such as temperature and humidity monitoring sensors etc.

The first communication device 121 and the second communication device 122 may be wanting to communicate with each other. Each communication device 121, 122 may be equipped with a Software-Defined Radio (SDR), i.e. with a respective antenna and a respective flexible Radio Frequency (RF) hardware being able to be reconfigured in real-time from software. In some embodiments, every communication device 121, 122 has a simple signaling protocol for protocol negotiation. In some embodiments, simple in the sense that it does not carry any more information than the ones required to establish the session, e.g. information on media types used.

In addition to the first and second communication devices 121, 122, gateway nodes that for example are SDR-equipped gateway nodes may be potentially part of the communications network 100, such as for example a gateway node 131 and a second gateway node 132. The gateway node 131 is denoted Gateway1 and the second gateway node 132 is denoted gateway2 in the Figures herein. The gateway node 131 and the second gateway node 132 may according to some embodiments mediate protocol negotiation in larger deployments such as cases where gateways need to support larger number of concurrent sessions than a few from a large number of nodes. This is e.g. where transmitting and receiving communication devices such as the first and second communication devices 121, 122 are out of range with each other.

The benefits for aligning all communication devices, including the first and second communication devices 121, 122, to use the same communication protocols are multiple: Cost efficiency in management of communication devices, communication enablement for communication devices from different manufacturers, quality assurance by making sure every communication device is using the same implementation or implementations of a protocol stack, etc.

Different network topologies of gateways and devices may be used to implement embodiments herein. The first and second communication devices 121, 122 may function both together with one or more gateways such as the gateway node 131 and the second gateway node 132 and without intermediate gateway nodes depending on the implementation. In case a transmitting wireless device, such as the first communication device 121, is out of range of a receiving communication device, such as the second communication device 122, gateways such as the gateway node 131 and in some embodiments the gateway node 131 may be used to reconfigure those first and second communication devices 121, 122 to use the same communication protocols and relay their data. In case the first and second communication devices 121, 122 can reach each other without any intermediate node, but do not have a compatible protocol, a gateway such as the gateway node 131 mediates the communication for protocol configuration. In another case where first and second communication devices 121, 122 can reach each other and have a compatible protocol, they can negotiate a protocol configuration by themselves without help from any node and start communicate directly.

Please note that that the gateway node 121 and the second gateway 132 are logically distinguished, i.e. it may be the same hardware server with 2 radio equipments.

Additionally a vendor of communication protocol stacks operate in the communications network 100. In some embodiments the first communications device 121 is co-located with the vendor of communication protocol stacks. In some other embodiments, a network node 140 is a vendor of communication protocol stacks. The vendor of communication protocol stacks is a node that comprises a list of communication protocol stacks and e.g. has a compatible communication interface such as a radio interface to e.g. the first and second communication devices 121, 122, the gateway node 131 and the second gateway node 132. The vendor of communication protocol stacks may transmit protocol stacks to requesting network nodes such as e.g. the first and second communication devices 121, 122, the gateway node 131 and the second gateway node 132, and may also interface to third-party licensing systems, in case the protocol stack to be transmitted requires a license or authorization, for example a proprietary communication protocol stack or a proprietary implementation of a communication protocol.

According to some embodiments herein, a system is provided that allows for dynamic reconfiguration of a communication protocol stack wherein one of the peers such as the first communication device 121 does not support any communication protocol in a Point-to-Point (Pt2Pt) session that the other peer such as the second communication device 121 has.

In some of these embodiments, the first communication device 121 requests a compatible communication protocol stack from a protocol vendor e.g. in the network node 140, which in turn provides the communication protocol stack. Subsequently e.g. by means detailed in SDR technology, the peer in question reconfigures its radio equipment in order to work with a compatible communication protocol stack.

According to some other embodiments herein, a system is provided that allows for dynamic reconfiguration of a communication protocol stack wherein one of the peers such as the first communication device 121 do support a communication protocol in a Pt2Pt session that the other peer such as the second communication device 121 has.

Embodiments herein are not limited to two nodes wanting to communicate as illustrated above, but may be extended to support an arbitrary amount of nodes either using compatible communication protocols or via intermediate protocol adaptation nodes.

Figure 2:
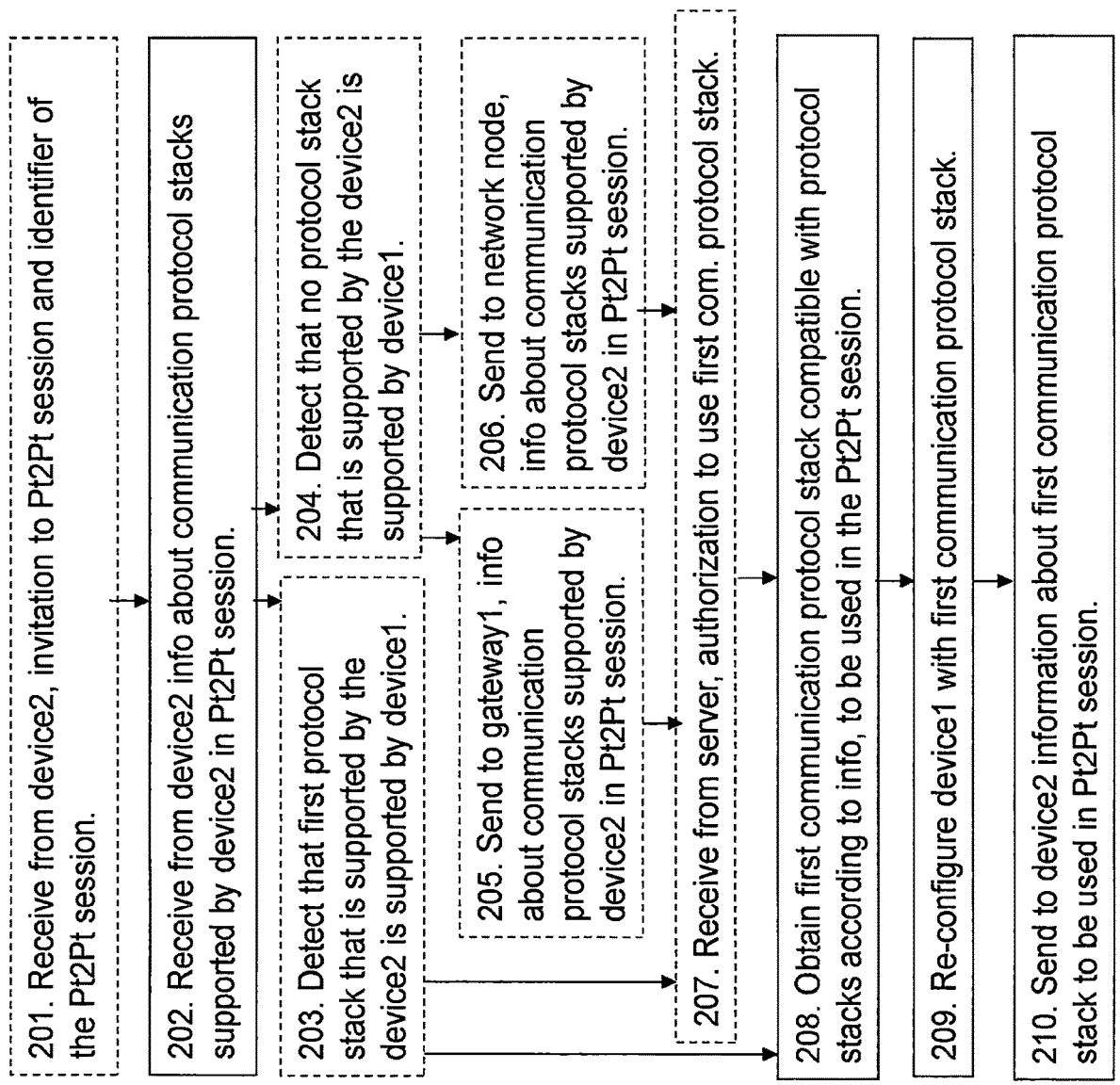
FIG. 2 is a flowchart depicting embodiments of a method in a first communication device.
Figure 3:
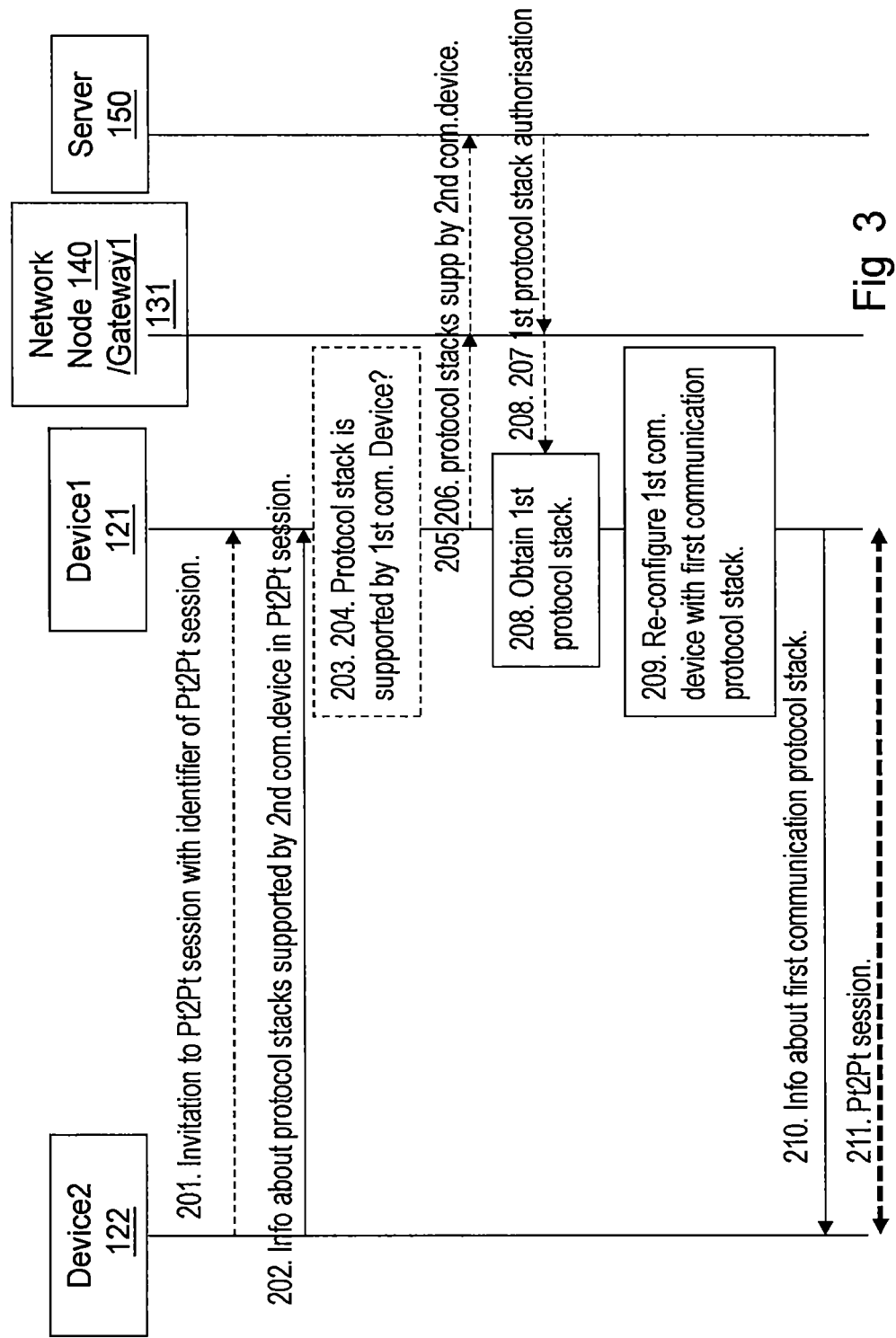
FIG. 3 is a sequence diagram illustrating a embodiments of a method.

Example embodiments of a method performed by the first communication device 121, for preparing a Pt2Pt session with the second communication device 122 will now be described with reference to a flowchart depicted in FIG. 2 and FIG. 3. The first communications device 121 may be co-located with a vendor of communication protocol stacks 140.

The method comprises the following actions, which actions may be taken in any suitable order. Dashed lines of some boxes in FIG. 2 indicate that this action is not mandatory.

In an example scenario, two nodes such as the first and second communication devices 121, 122 want to communicate in a Pt2Pt session. The two nodes may not have compatible protocol stacks a priori.

Action 201

In some embodiments, the first communication device 121 is made aware of that the second communication device 122 want to communicate in a Pt2Pt session by receiving an invitation. Thus, the first communication device 121 may receive from the second communication device 122, an invitation to the Pt2Pt session. The invitation comprises an identifier of the Pt2Pt session.

The identifier may be a simple, unique alphanumeric, preferably using but not limited to the American Standard Code for Information Interchange (ASCII) character set, generated using a pseudo-random alphanumeric generator, which may use but is not limited to using the MAC address of the radio of the session initiating radio device as seed).

The identifier may be used in below actions to identify the particular Pt2Pt session. The message to the second communication device 122 in Action 210 below may comprise the identifier of the Pt2Pt session. Further, any one out of the message to the gateway node 131 in Action 205 and the message to network node 140 in Action 206 below may comprise the identifier of the Pt2Pt session.

An example of a session protocol that may be used is the Session Initiation Protocol (SIP). The invitation may then be sent in a SIP INVITE message according to the protocol specifications. In this case it is comprised in SIP INVITE message headers, the session identifier which is Call-ID in case of SIP, the Universal Resource Identifier (URI) of the initiating device and the URI of the peer. The SIP INVITE will be sent without a Session Description Protocol (SDP) body.

Action 202

The second communication device 122 will inform the first communication device 121 about any protocol that is supported in the second communication device 122 and that can be used in the Pt2Pt session. Therefore, the first communication device 121 receives from the second communication device 122, information about one or more communication protocol stacks that are supported by the second communication device 122 for use in the Pt2Pt session.

Information about the communication protocol stacks may be encapsulated in the body of a SIP INFO message. The body contains a list of communication protocol stack, each stack containing itself a list of information about the protocols can contain but are not limited to the name of each protocol and the version of the protocol implemented as well as it's position on the stack. Additional information include compatibility of this version of the protocol with previous versions as well as interoperability of this protocol with other protocols.

Action 203

This action relates to some first embodiments, wherein both peers support a first communication protocol stack which will be negotiated. I.e. the first communication devices 121 support a communication protocol stack that is supported by the second communication device 122. Thus in these embodiments, the first communication device 121 detects that the first communication protocol stack out of the one or more protocol stacks supported by the second communication device 122 is supported by the first communication device 121.

Action 204

This action relates to some second and third embodiments. In the second and third embodiments, the first communication device 121 detects that no one out of the one or more protocol stacks that are supported by the second communication device 122 is supported by the first communication device 121.

This may be detected in the first communication device 121 by comparing the list of communication protocol stacks it received from the second communication device 122 with it's own lists of protocol stacks currently supported. If there is no overlap on the protocol stacks then the first communication device 121 detects that no protocol stacks are supported. Note that the comparison involves comparing the names and the version of the protocols per layer, but also information such as protocol interoperability and protocol version backwards compatibility are also taken under account.

Action 205

This action relates to the second embodiments, wherein the first communication device 121 has detected that no one out of the one or more protocol stacks that are supported by the second communication device 122 is supported by the first communication device 121. In these second embodiments, the first communication device 121 may send in a message to the first gateway node 131, the information about the one or more communication protocol stacks that are supported by the second communication device 122 in the Pt2Pt session. The message to the first gateway node 131 may comprise the identifier of the Pt2Pt session if received in Action 201.

This message may be a SIP INFO message, with a list of communication protocol stacks as body.

Action 206

This action relates to the third embodiments, wherein the first communication device 121 has detected that no one out of the one or more protocol stacks that are supported by the second communication device 122 is supported by the first communication device 121 as mentioned in Action 204. In these third embodiments, the first communication device 121 sends in a message to the network node 140, the information about the one or more communication protocol stacks that are supported by the second communication device 122 in the Pt2Pt session. The message to the network node 140 may comprise the identifier of the Pt2Pt session if received in Action 201. The network node 140 may be a vendor of communication protocol stacks.

This message may be a SIP INFO message, with a list of communication protocol stacks as body.

Action 207

In some embodiments, an authorization of the first communication protocol stack to be used in the Pt2Pt session is required, for example, when the communication protocol stack is proprietary.

The first communication device 121 may receive an authorization from a server 150, which authorization authorizes the first communication protocol stack to be used in the Pt2Pt session. The authorization may be received from the server 150 via the network node 140.

The authorization process on the server 150 may involve additional communication between the first device 121 and the server 150 using an authorization protocol such as Diameter, or OAuth.

Action 208

The first communication device 121 obtains a first communication protocol stack that is compatible with at least one out of the one or more protocol stacks that are supported by the second communication device 122, which first communication protocol stack will be used in the Pt2Pt session with the second communication device 122, In the first embodiments, the first communication device 121 has detected that the first communication protocol stack out of the one or more protocol stacks supported by the second communication device 122 is supported by the first communication device 121 as mentioned in Action 203. In these first embodiments said first communication protocol stack may be obtained from a memory in the first communication device 121.

In the second and third embodiments the first communication device 121 detects that no one out of the one or more protocol stacks that are supported by the second communication device 122 is supported by the first communication device 121 as mentioned in Action 204.

In the second embodiments, the first communication device 121 has sent in a message to the first gateway node 131, the information about the one or more communication protocol stacks that are supported by the second communication device 122 in the Pt2Pt session as mentioned in Action 205. In these embodiments, the obtaining of the first communication protocol stack comprises receiving the first communication protocol stack from the first gateway node 131.

This message may be a SIP INFO message, with the said first communication protocol stack as body.

In the third embodiments, the first communication device 121 has sent in a message to the network node 140, the information about the one or more communication protocol stacks that are supported by the second communication device 122 in the Pt2Pt session as mentioned in Action 206. The network node 140 is a vendor of communication protocol stacks. In these embodiments, the obtaining the first communication protocol stack comprises receiving the first communication protocol from the network node 140.

This message may be a SIP INFO message, with the said first communication protocol as body.

Action 209

The first communication device 121 re-configures the first communication device 121 to use the first communication protocol stack in the Pt2Pt session The reconfiguration process involves installing the new communication protocol stack by means of flashing the firmware of the device or installing software or reconfiguring the radio of the device to use the new protocol stack in case of the protocol requiring reconfiguration of radio signal modulation/demodulation using a software defined radio due to different specifications of the new physical layer of the protocol stack such as SDR, or any combination of the aforementioned.

Action 210

The first communication device 121 also sends a message to the second communication device 122, which message comprises information about said compatible first communication protocol stack which is to be used in the Pt2Pt session. The message to the second communication device 122 may comprise the identifier of the Pt2Pt session.

This message may be a SIP INFO message, with the said information as body.

Action 211

In this action the Pt2Pt session is established.

In some embodiments, data buffering to avoid latency caused from protocol negotiation and reconfiguration sequence is provided. There may be times when two or more nodes such as the first and second communication devices 121, 122 establishing a Pt2Pt session want to exchange data immediately, prior to the protocol reconfiguration. In this case, another network node, an intermediate network node (not shown) may act as intermediate storage, providing a buffering service storing the data transmitted between the first and second communication devices 121, 122, and relaying the data to the corresponding recipient peer when protocol reconfiguration is complete.

In these embodiments, data is received from the second communication device 122. The data is was sent by the second wireless device 122 before the re-configuring of the first communication device 121 is completed and said data is received when the Pt2Pt session is established via an intermediate node acting as an intermediate storage of said data.

Figure 4A:
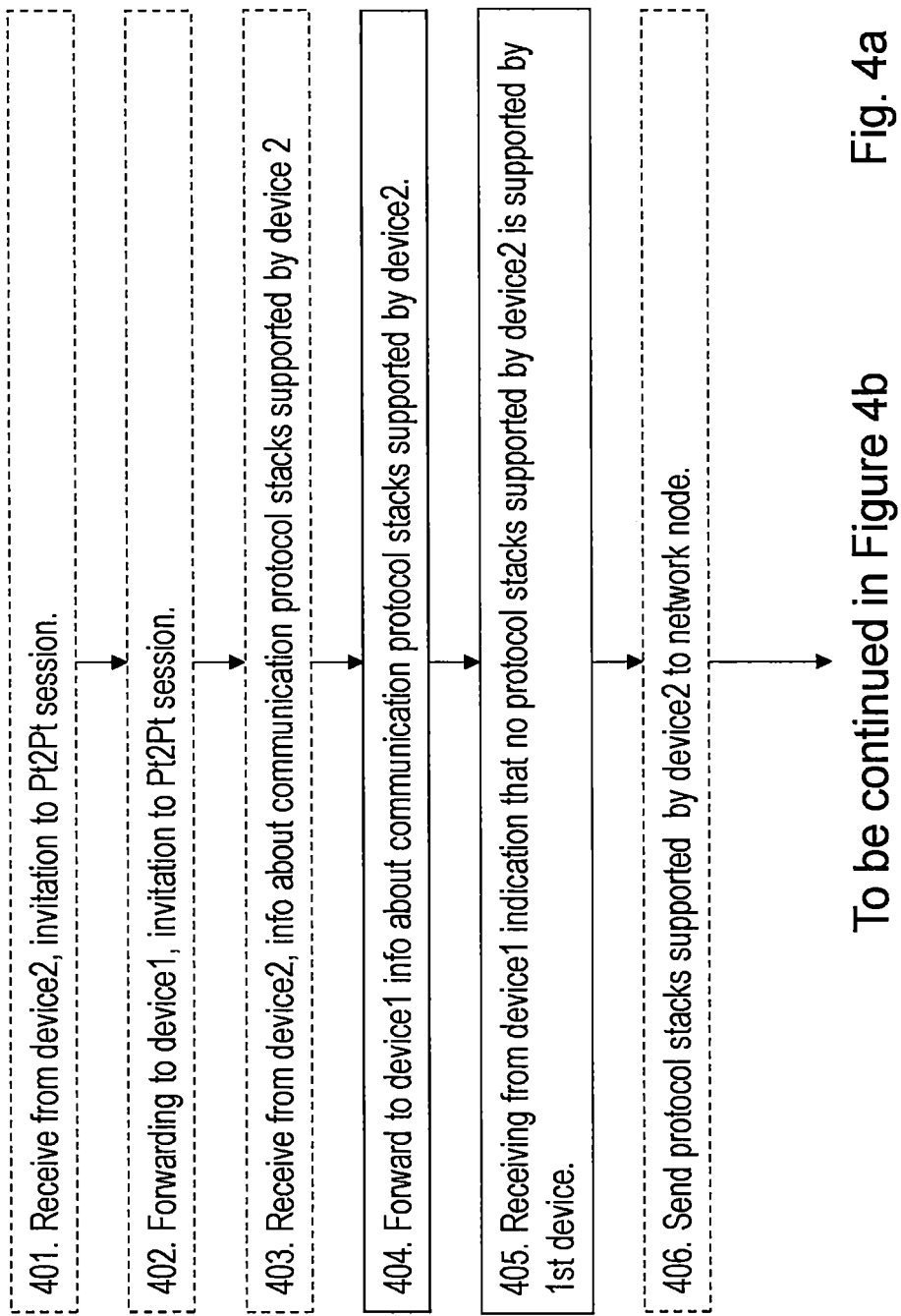
FIGS. 4a and b are flowchart depicting embodiments of a method in a first communication device.
Figure 4B:
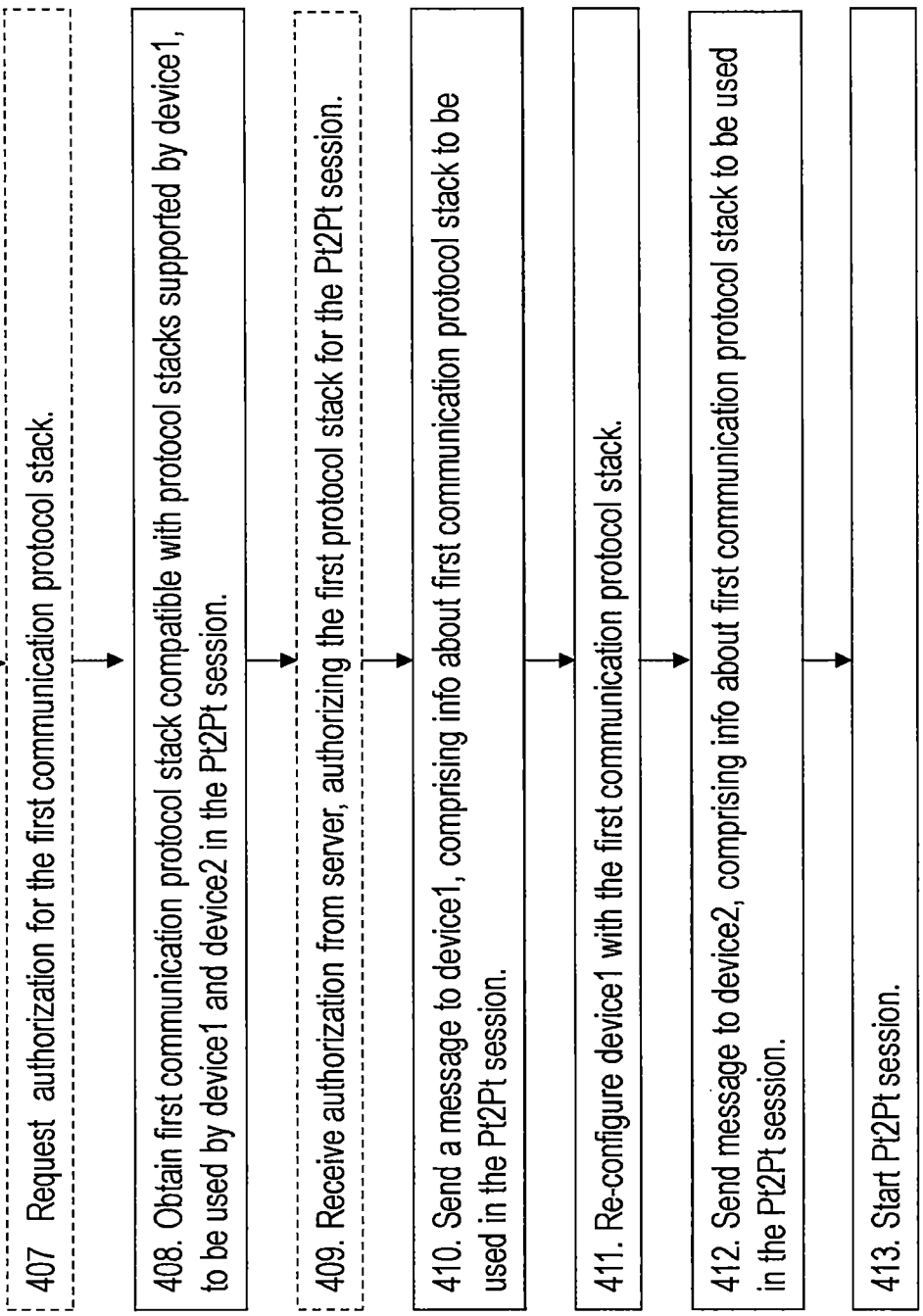

Example embodiments of a method performed by the gateway node 131, for assisting in preparing a Pt2Pt session between the first communication device 121 and the second communication device 122, will now be described with reference to a sequence diagram depicted in FIG. 4a, 4b and FIG. 5. Actions 401-406 are depicted in FIG. 4a and Actions 407-413 are depicted in FIG. 4b. In some embodiments the gateway node 131 may be co-located with the vendor of communication protocol stacks 140.

The method comprises the following actions, which actions may be taken in any suitable order. In an example scenario, two nodes such as the first and second communication devices 121, 122 want to communicate in a Pt2Pt session. The two nodes do not have compatible protocol stacks a priori.

Action 401

In an example embodiment, the gateway node 131 receives from the first communication device 121, an invitation to the Pt2Pt session. Here, the SIP INVITE message may be used. The invitation may comprise an identifier of the Pt2Pt session. The invitation may be received via the second gateway node 132, e.g in case of no SDR on the receiving device.

Action 402

In some embodiments, the gateway node 131 forwards the invitation to the Pt2Pt session to the first communication device 121. The invitation comprises the identifier, of the Pt2Pt session. The invitation has been received from the second communication device 122. This message may be a SIP INFO message, with the said information as body.

Action 403

The gateway node 131 receives from the second communication device 122, information about the one or more communication protocol stacks that are supported by the second communication device 122 in the Pt2Pt session. The information may be received via the second gateway node 132. This message may be a SIP INFO message, with the said information as body.

Action 404

The gateway node 131 forwards to the first communication device 121, the information about the one or more communication protocol stacks that are supported by the second communication device 122 in the Pt2Pt session. The information has been received from the second communication device 122. This message may be a SIP INFO message, with the said information as body.

Action 405

The gateway node 131 receives in a message from the first communication device 121, an indication that no one out of the one or more protocol stacks that are supported by the second communication device 122 in the Pt2Pt session, is supported by the first communication device 121. This message may be a SIP INFO message, with the said information as body.

Action 406

In some embodiments, the network node 140 comprises the vendor of communication protocol stacks. In these embodiments, the gateway node 131 may send in a message to the network node 140, the information about the one or more communication protocol stacks that are supported by the second communication device 122 in the Pt2Pt session. The message to the network node 140 may further comprise the session ID of the Pt2Pt session. This message may be a SIP INFO message, with the said information as body.

Action 407

When the indication that no one out of the one or more protocol stacks that are supported by the second communication device 122 in the Pt2Pt session has been received, the gateway node 131 may send the information about the one or more communication protocol stacks that are supported by the second communication device 122 in the Pt2Pt session to the server 150 to request an authorization that authorizes the first communication protocol stack to be used in the Pt2Pt session.

SIP INFO may be used to send the info, subsequent authorization may be done using an authorization protocol such as OAuth, DIAMETER as per previous.

Action 408

The gateway node 131 obtains a first communication protocol stack from a vendor of communication protocol stacks. The first communication protocol stack is compatible with at least one out of the one or more protocol stacks that are supported by the first communication device 121. The first communication protocol stack is to be used by the first communication device 121 and the second communication device 122 in the Pt2Pt session. This message may be a SIP INFO message, with the said information as body.

Action 409

The gateway node 131 may receive an authorization from the server 150. The authorization authorizes the first communication protocol stack to be used in the Pt2Pt session. The authorization may be received from the server 150 via the network node 140. DIAMETER or OAuth authorization protocols may be used as above.

Action 410

The gateway node 131 sends a message to the first communication device 121. The message comprises information about said obtained first communication protocol stack which is to be used in the Pt2Pt session. This message may be a SIP INFO message, with the said information as body.

Action 411

The gateway node 131 re-configures the first communication device 121 to use said first communication protocol stack in the Pt2Pt session.

As mentioned above, the reconfiguration process involves installing the new communication protocol stack by means of flashing the firmware of the device or installing software or reconfiguring the radio of the device to use the new protocol stack in case of the protocol requiring reconfiguration of radio signal modulation/demodulation using a software defined radio due to different specifications of the new physical layer of the protocol stack such as SDR, or any combination of the aforementioned.

Action 412

The gateway node 131 sends a message to the second communication device 122. The message comprises information about said first communication protocol stack which is to be used in the Pt2Pt session. The message to the second communication device 122 may be sent via the second gateway node 132. This message may be a SIP INFO message, with the said information as body.

Action 413

The Pt2Pt session is established.

Embodiment's herein will now be further described and explained. The text below is applicable to and may be combined with any suitable embodiment described above.

The identifier is used to identify the session. Every message subsequent to the SIP INVITE and belonging to the same session has the same identifier.

In some embodiments the second communication device 122 being a Non-SDR communication device negotiating communication protocol stack with the first communication device 121 being a SDR communication device over the gateway node 131 being an SDR gateway.

In this example, two devices such as the first and second communication devices 121, 122 in a scenario of establishing a session and exchanging data. One of the devices, the second communication device 122 is a sensor transmitting CO2 concentration in a room. The other device, i.e. the first communication device 121 is a mobile phone wanting to receive this information and notify its user about the CO2 concentration. The mobile phone is equipped with an SDR and the sensor is not equipped with SDR. The gateway node 131 being an SDR gateway discovers the phone and the sensor by means of a discovery protocol such as e.g. Service Location Protocol (SLP).

As described above, in some embodiments the gateway connects to the protocol vendor instead of the phone or as an alternative, the gateway itself may be the protocol vendor.

The above examples also applies in case the gateway node 131 does not have an SDR. In this case, the phone, i.e. the first communication device 121, having an SDR may discover the gateway node 131.

Figure 6:
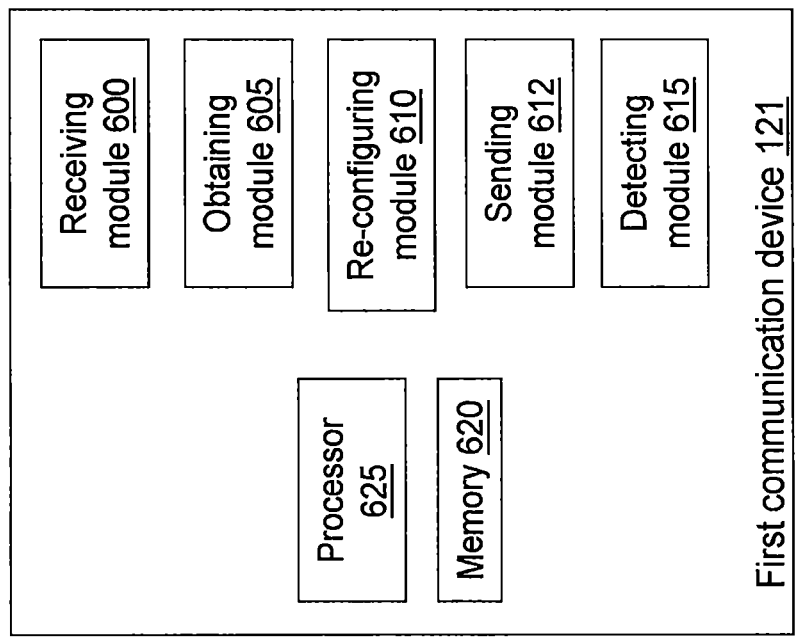
FIG. 6 is a schematic block diagram illustrating embodiments of a first communication device.

To perform the method actions for preparing a Pt2Pt session with the second communication device 122, described above in relation to FIGS. 2 and 3, the first communication device 121 may comprise the following arrangement depicted in FIG. 6. As mentioned above. The first communications device 121 is co-located with the vendor of communication protocol stacks 140.

The first communication device 121 is configured to, e.g. by means of a receiving module 600 configured to, receive from the second communication device 122, information about one or more communication protocol stacks that are supported by the second communication device 122 for use in the Pt2Pt session. The receiving module 600 may be comprised in a receiver of the first communication device 121.

The first communication device 121 is further configured to, e.g. by means of a obtaining module 605 configured to, obtain a first communication protocol stack that is compatible with at least one out of the one or more protocol stacks that are supported by the second communication device 122. The first communication protocol stack is arranged to be used in the Pt2Pt session with the second communication device 122.

The first communication device 121 is further configured to, e.g. by means of a re-configuring module 610 configured to, re-configure the first communication device 121 to use the first communication protocol stack in the Pt2Pt session.

The first communication device 121 is further configured to, e.g. by means of a sending module 612 configured to, send a message to the second communication device 122. The message comprises information about said compatible first communication protocol stack which is arranged to be used in the Pt2Pt session. The sending module 612 may be comprised in a transmitter of the first communication device 121.

In some embodiments, the first communication device 121 is further configured to, e.g. by means of a detecting module 615 configured to, detect that the first communication protocol stack out of the one or more protocol stacks supported by the second communication device 122 is supported by the first communication device 121. In these embodiments, said first communication protocol stack is arranged to be obtained from a memory such as a memory 620 in the first communication device 121.

The first communication device 121 may further be configured to e.g. by means of the detecting module 615 configured to, detect that no one out of the one or more protocol stacks that are supported by the second communication device 122 is supported by the first communication device 121.

In some embodiments, the first communication device 121 is further configured to, e.g. by means of the sending module 612 configured to, send in a message to a first gateway node 131, the information about the one or more communication protocol stacks that are supported by the second communication device 122 in the Pt2Pt session.

In some embodiments, the first communication device 121 is further configured to, e.g. by means of the obtaining module 605 configured to, obtain the first communication protocol stack by receiving the first communication protocol stack from the first gateway node 131.

In some embodiments, the first communication device 121 is further configured to, e.g. by means of the sending module 612 configured to, send in a message to a network node 140, the information about the one or more communication protocol stacks that are supported by the second communication device 122 in the Pt2Pt session. The network node 140 may be a vendor of communication protocol stacks.

In some embodiments, the first communication device 121 is further configured to, e.g. by means of the obtaining module 605 configured to obtain the first communication protocol stack by receiving the first communication protocol from the network node 140.

The first communication device 121 may be configured to, e.g. by means of the receiving module 600 configured to, receive from the second communication device 122, an invitation to the Pt2Pt session, which invitation comprises an identifier of the Pt2Pt session.

The message to the second communication device 122 may further be arranged to comprise the identifier of the Pt2Pt session. Any one out of the message to the gateway node 131 and the message to network node 140 may further be arranged to comprise the identifier of the Pt2Pt session.

The first communication device 121 may be configured to, e.g. by means of the receiving module 600 configured to, receive an authorization from the server 150, which authorization authorizes the first communication protocol stack to be used in the Pt2Pt session.

The first communication device 121 may be configured to, e.g. by means of the receiving module 600 configured to receive the authorization from the server 150 via the network node 140.

In some embodiments, the first communication device 121 is configured to, e.g. by means of the receiving module 600 configured to receive data from the second communication device 122. The data is arranged to be sent by the second wireless device 122 before the re-configuring of the first communication device 121 is completed and which data is received when the Pt2Pt session is established via an intermediate node acting as an intermediate storage of said data.

The embodiments herein comprising the process of preparing a Pt2Pt session with the second communication device 122 may be implemented through one or more processors, such as a processor 625 in the first communication device 121 depicted in FIG. 6, together with computer program code for performing the functions and actions of the embodiments herein. The program code mentioned above may also be provided as a computer program product, for instance in the form of a data carrier carrying computer program code for performing the embodiments herein when being loaded into the first communication device 121. One such carrier may be in the form of a CD ROM disc. It is however feasible with other data carriers such as a memory stick. The computer program code may furthermore be provided as pure program code on a server and downloaded to the first communication device 121.

The end-user policy server 145 may further comprise the memory 620 comprising one or more memory units. The memory 620 comprises instructions executable by the processor 625.

The memory 620 is arranged to be used to store e.g. communication protocol stacks applications, identifiers of Pt2Pt sessions, authorizations for communication protocol stacks, data, configurations, and applications to perform the methods herein when being executed in the first communication device 121.

Those skilled in the art will also appreciate that the receiving module 600, the obtaining module 605, the configuring module 610, the sending module 612, and the detecting module 615, described above may refer to a combination of analog and digital circuits, and/or one or more processors configured with software and/or firmware, e.g. stored in the memory 620, that when executed by the one or more processors such as the processor 625 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 5:
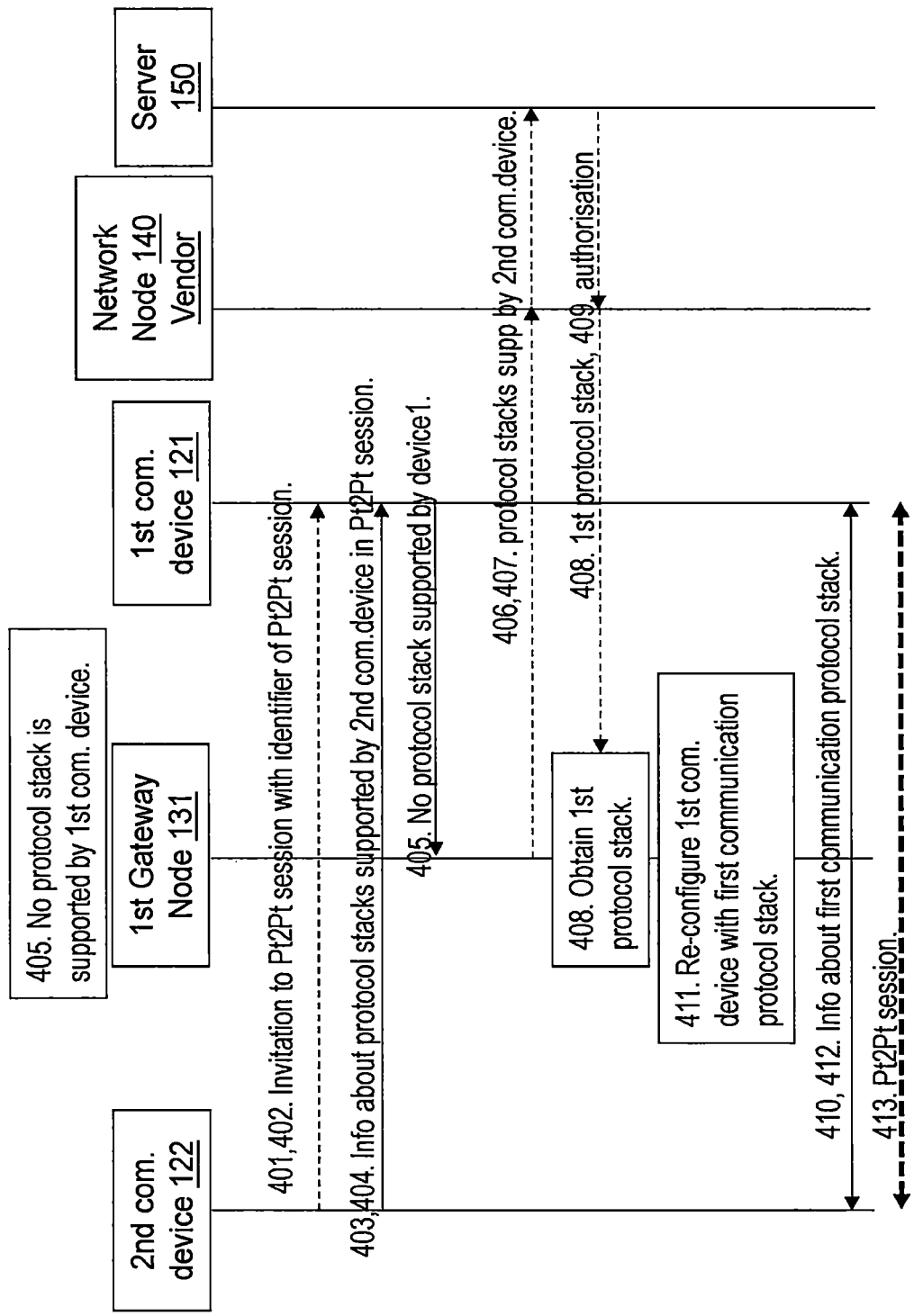
FIG. 5 is a sequence diagram illustrating a embodiments of a method.
Figure 7:
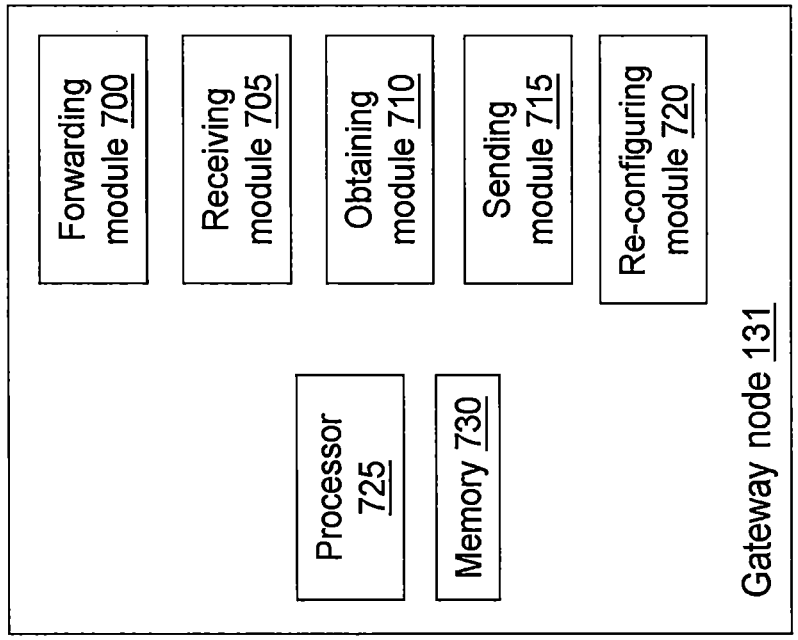
FIG. 7 is a schematic block diagram illustrating embodiments of a gateway node.

To perform the method actions for assisting in preparing a point-to-point, Pt2Pt, session between a first communication device 121 and a second communication device 122, in relation to FIGS. 4a and b, and FIG. 5, the gateway node 131 may comprise the following arrangement as depicted in FIG. 7.

The gateway node 131 is configured to, e.g. by means of a forwarding module 700 configured to forward to the first communication device 121, information about the one or more communication protocol stacks that are arranged to be supported by the second communication device 122 in the Pt2Pt session. The information is arranged to have been received from the second communication device 122.

The gateway node 131 is further configured to, e.g. by means of a receiving module 705 configured to receive in a message from the first communication device 121, an indication that no one out of the one or more protocol stacks that are supported by the second communication device 122 in the Pt2Pt session, is supported by the first communication device 121. The receiving module 705 may be comprised in a receiver of the gateway node 131.

The gateway node 131 is further configured to, e.g. by means of an obtaining module 710 configured to obtain a first communication protocol stack from a vendor of communication protocol stacks. The first communication protocol stack is compatible with at least one out of the one or more protocol stacks that are arranged to be supported by the first communication device 121. The first communication protocol stack is arranged to be used by the first communication device 121 and the second communication device 122 in the Pt2Pt session. The gateway node 131 may be co-located with the vendor of communication protocol stacks 140.

The gateway node 131 is further configured to, e.g. by means of a sending module 715 configured to send a message to the first communication device 121, which message comprises information about said obtained first communication protocol stack which is arranged to be used in the Pt2Pt session. The sending module 715 may be comprised in a transmitter of the gateway node 131.

The gateway node 131 is further configured to, e.g. by means of a re-configuring module 720 configured to, re-configure the first communication device 121 to use said first communication protocol stack in the Pt2Pt session.

The gateway node 131 is further configured to, e.g. by means of the sending module 715 configured to, send a message to the second communication device 122, which message comprises information about said first communication protocol stack which is arranged to be used in the Pt2Pt session.

In some embodiments, the network node 140 is arranged to comprise the vendor of communication protocol stacks. In these embodiments, the gateway node 131 may further be configured to, e.g. by means of the sending module 715 configured to, send in a message to the network node 140, the information about the one or more communication protocol stacks that are arranged to be supported by the second communication device 122 in the Pt2Pt session.

In some embodiments, the gateway node 131 is further configured to, e.g. by means of the sending module 715 configured to, send to the first communication device 121, an invitation to the Pt2Pt session, which invitation comprises an identifier of the Pt2Pt session. The invitation is arranged to have been received from the second communication device 122. The message to the network node 140 may further comprise the session ID of the Pt2Pt session.

The gateway node 131 may further be configured to, e.g. by means of the receiving module 705 configured to receive an authorization from a server 150, which authorization authorizes the first communication protocol stack to be used in the Pt2Pt session. The authorization may be arranged to have been received from the server 150 via the network node 140.

The embodiments herein comprising the process of for assisting in preparing a point-to-point, Pt2Pt, session between a first communication device 121 and a second communication device 122, may be implemented through one or more processors, such as the processor 725 in the gateway node 131 depicted in FIG. 7, together with computer program code for performing the functions and actions of the embodiments herein. The program code mentioned above may also be provided as a computer program product, for instance in the form of a data carrier carrying computer program code for performing the embodiments herein when being loaded into the gateway node 131. One such carrier may be in the form of a CD ROM disc. It is however feasible with other data carriers such as a memory stick. The computer program code may furthermore be provided as pure program code on a server and downloaded to the gateway node 131.

The gateway node 131 may further comprise a memory comprising one or more memory units, such as such as the memory 730 in the gateway node 131 depicted in FIG. 7. The memory 730 comprises instructions executable by the processor 725.

The memory 730 is arranged to be used to store e.g. communication protocol stacks applications, identifiers of Pt2Pt sessions, authorizations for communication protocol stacks, data, configurations, and applications to perform the methods herein when being executed in the gateway node 131.

Those skilled in the art will also appreciate that the modules in the gateway node 131 described above may refer to a combination of analog and digital circuits, and/or one or more processors configured with software and/or firmware, e.g. stored in the memory 730 in the gateway node 131 that when executed by the one or more processors such as the processor 725 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method performed by a first communication device, the method comprising:
   receiving signaling from a gateway node of a cellular communication system, the signaling received via a cellular radio link and comprising an invitation for a Point-to-Point (Pt2Pt) communication session with a second communication device, and further comprising an indication of one or more communication protocol stacks supported by the second communications device for the Pt2Pt communication session, where the Pt2Pt communication session uses a direct radio link between the first and second communication devices;
   determining that none of the one or more supported communication protocol stacks are available at the first communication device; and
   responsive to determined unavailability, obtaining one of the one or more supported communication protocol stacks from a vendor node in the cellular communication system, the vendor node being the gateway node or a further node reachable through the gateway node, the obtaining including receiving further signaling from the gateway node conveying via the cellular radio link, as an obtained communication protocol stack, one of the one or more supported communication protocol stacks, in an installable form;
   configuring a software defined radio (SDR) of the first communication device to use the obtained communication protocol stack for the Pt2Pt communication session, based on installing the obtained communication protocol stack at the first communication device; and
   establishing the Pt2Pt communication session with the second communication device, based on communicating over a direct radio link with the second communication device, via the configured SDR.

2. The method of claim 1, further comprising transmitting a message via the cellular radio link to the gateway for conveyance to the second communication device via the cellular communication system, the message sent before establishing the Pt2Pt communication session with second communication device and indicating the obtained communication protocol stack.

3. The method of claim 2, wherein receiving the first signaling comprises receiving a Session Initiation Protocol (SIP) INVITE message and a SIP INFO message transmitted by the gateway node, the SIP INVITE message inviting establishment of the Pt2Pt communication session and the SIP INFO message indicating the one or more supported communication protocol stacks.

4. The method of claim 1, wherein obtaining one of the one or more supported communication protocol stacks from the vendor node comprises transmitting a request to the vendor node, via the gateway node.

5. A first communication device comprising:
   communication circuitry; and
   processing circuitry configured to:
      receive, via the communication circuitry, signaling from a gateway node of a cellular communication system, the signaling received via a cellular radio link and comprising an invitation for a Point-to-Point (Pt2Pt) communication session with a second communication device, and further comprising an indication of one or more communication protocol stacks supported by the second communications device for the Pt2Pt communication session, where the Pt2Pt communication session uses a direct radio link between the first and second communication devices;
      determine that none of the one or more supported communication protocol stacks are available at the first communication device; and
      responsive to determined unavailability, obtain, as an obtained communication protocol stack, one of the one or more supported communication protocol stacks from a vendor node in the cellular communication system, the vendor node being the gateway node or a further node reachable through the gateway node, the obtained communication protocol stack being received in installable form, via further signaling from the gateway node conveyed via the cellular radio link;

configure a software defined radio (SDR) of the first communication device to use the obtained communication protocol stack for the Pt2Pt communication session, based on installing the obtained communication protocol stack at the first communication device; and establish the Pt2Pt communication session with the second communication device, based on communicating over a direct radio link with the second communication device, via the configured SDR.

6. The first communication device of claim 5, wherein the processing circuitry is configured to transmit a message via the cellular radio link to the gateway for conveyance to the second communication device via the cellular communication system, the message sent before establishing the Pt2Pt communication session with second communication device and indicating the obtained communication protocol stack.

7. The first communication device of claim 6, wherein the signaling is a Session Initiation Protocol (SIP) INVITE message and a SIP INFO message transmitted by the gateway node, the SIP INVITE message inviting establishment of the Pt2Pt communication session and the SIP INFO message indicating the one or more supported communication protocol stacks.

8. The first communication device of claim 5, wherein, to obtain one of the one or more supported communication protocol stacks from the vendor node, the processing circuitry is configured to transmit, via the communication circuitry, a request to the vendor node, via the gateway node.

* * * * *